UNITED STATES PATENT OFFICE.

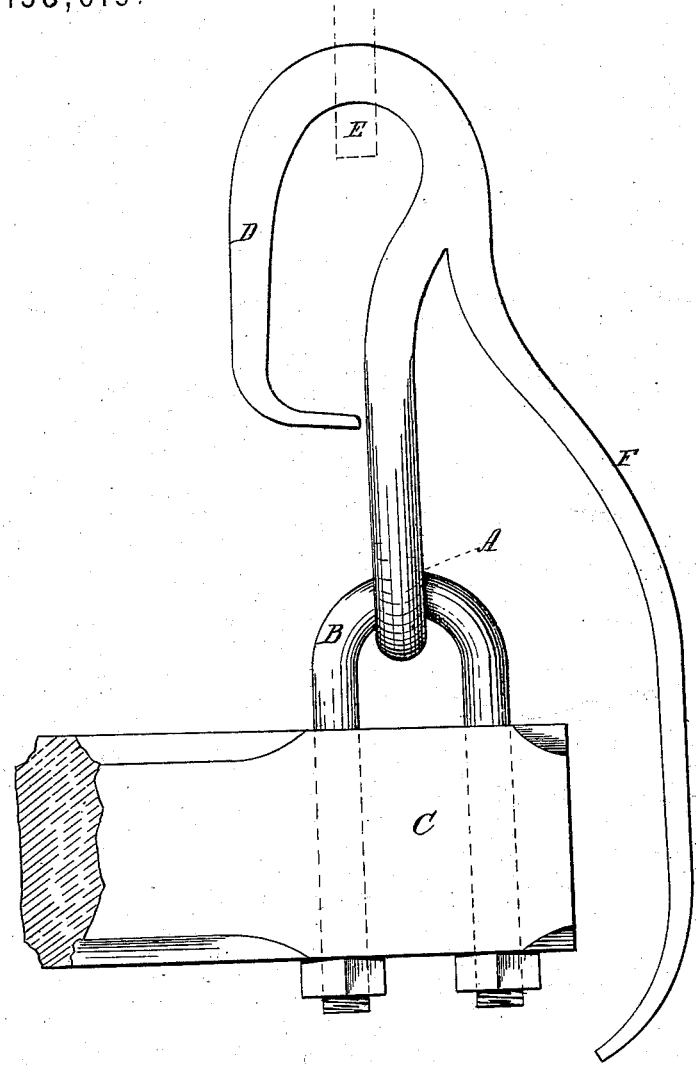

JAMES T. DODSON, OF KANE, ILLINOIS.

IMPROVEMENT IN DRAFT-HOOKS FOR WHIFFLETREES, &c.

Specification forming part of Letters Patent No. 138,619, dated May 6, 1873; application filed April 29, 1873.

*To all whom it may concern:*

Be it known that I, JAMES T. DODSON, of Kane, in the county of Greene and State of Illinois, have invented a new and useful Improvement in Hooks for Draft-Chains, Whiffletrees, &c., of which the following is a specification:

The object of my invention is to prevent the ends of the whiffletree from striking any object in passing, or being struck or caught by passing vehicles, by the combination, with the draft-hook, of a guard or shield, extending back so as to cover and protect the end of the whiffletree to which the hook is secured by warding off any obstacle which may be in the line of the trace or come suddenly within the range of the forward movement of the hook or end of the whiffletree, as shown in the top view of the accompanying drawing.

The hook may be of the usual construction, having an eye, A, for fastening it by means of a staple, B, to the end of the whiffletree C, and a hook, D, for the trace E, the bent end of said hook being closed with the eye A to prevent the accidental detachment of the trace. A guard or shield, F, is formed upon or with the hook in any suitable manner, and extends backward in the line of the end of the whiffletree, either in a curved or inclined direction from the hook, in order that it may pass just opposite the end without touching the whiffletree, and shield it from contact with any object whatever, either fixed or moving, and thereby save the whiffletree from danger of being broken, and especially in plowing, from catching into objects, such as trees, or being entangled with standing corn or hedge-growth and other obstructions.

I prefer to make the guard F a part of the hook D, so as to extend rearwardly and protect both the hook and the whiffletree; but it is obvious the guard may be secured to and project beyond or in front of the end of the whiffletree.

Having described my invention, I claim—

In a draft-hook for whiffletrees, the combination therewith and with the whiffletree of the guard or shield F, essentially as described.

In testimony whereof I have hereunto set my hand, in the presence of two subscribing witnesses, this 22d day of April, A. D. 1873.

JAMES T. DODSON.

Witnesses:
   A. E. H. JOHNSON,
   J. W. HAMILTON JOHNSON.